April 2, 1963
C. R. FISCHER
3,083,809
ROTARY FEED APPARATUS
Filed May 27, 1958
2 Sheets-Sheet 1
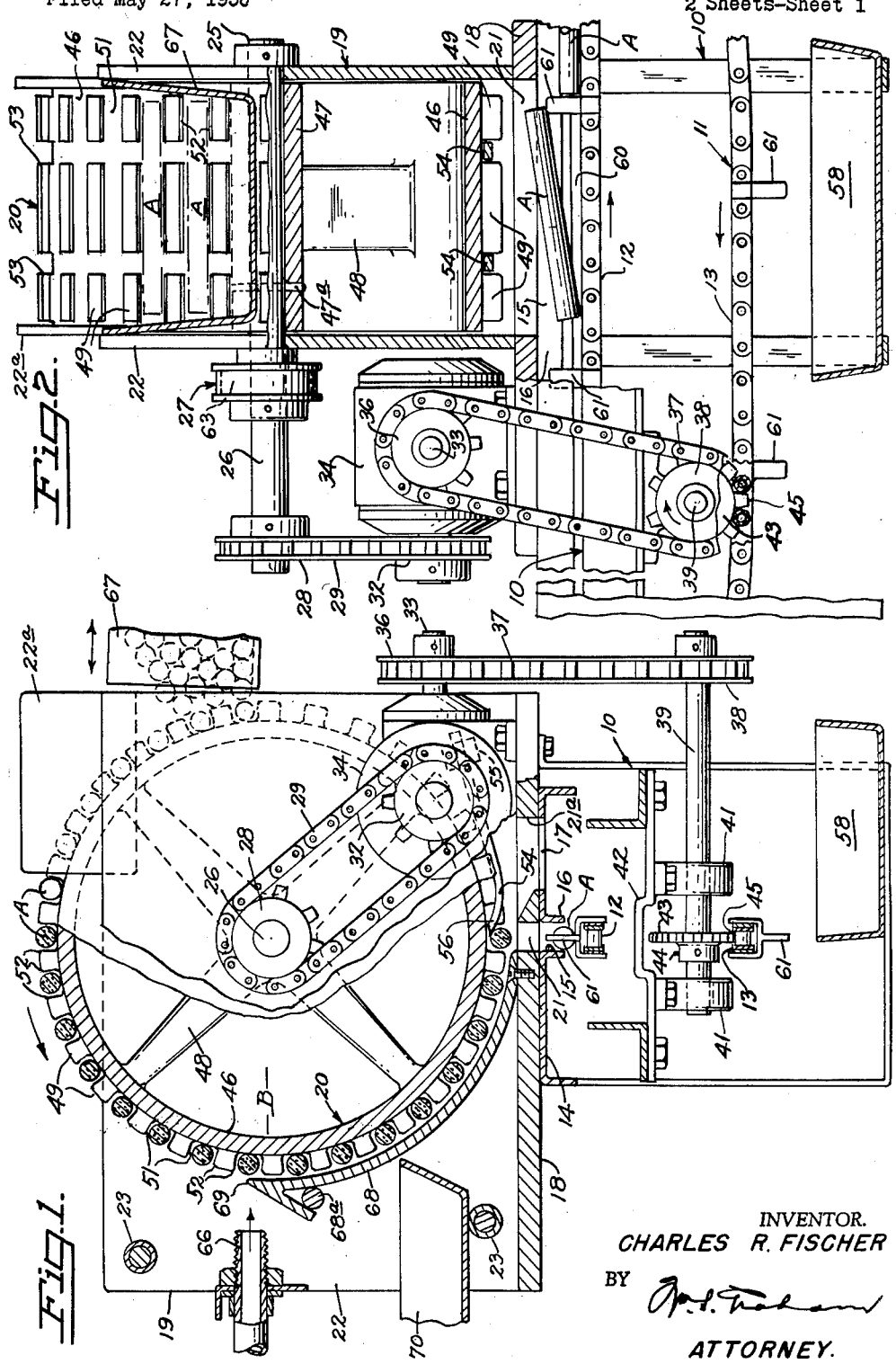
INVENTOR.
CHARLES R. FISCHER
BY
ATTORNEY.

INVENTOR.
CHARLES R. FISCHER
BY
ATTORNEY

United States Patent Office 3,083,809
Patented Apr. 2, 1963

3,083,809
ROTARY FEED APPARATUS
Charles R. Fischer, Corte Madera, Calif., assignor to American Licorice Company, Chicago, Ill., a corporation of Illinois
Filed May 27, 1958, Ser. No. 738,119
2 Claims. (Cl. 198—25)

This invention relates to rotary feed apparatus and relates more particularly to such apparatus which is adapted for feeding suitable elongated products in single units to a conveyor means which moves parallel to the axis of rotation of the feed apparatus.

One advantageous use of the invention may be exemplified in rotary feed means for separate units of elongated articles to one portion of a conveyor for conveying the articles to another portion of the conveyor for any suitable end purpose, such as wrapping, labeling, counting or the like, the invention being herein exemplified in means for feeding of elongated sticks of candy indicated $a$, to such a conveyor.

Briefly described, the invention comprises a rotary axially elongated cylindrical drum of suitable width, and drive means therefor; the drum having at its circumference elongated axially transverse pockets or grooves parallel to its axis for receiving the separate units of the product; a driven conveyor means which moves below the drum parallel to the axis of the drum; means for stripping the product from the pocket grooves as the drum rotates and depositing them on the conveyor as separate units in end-to-end relation; the conveyor preferably having fingers appropriately relatively spaced in accordance with the respective rotational speed of the drum and the longitudinal movement of the conveyor; and drive means suitably synchronized between the rotating drum and conveyor whereby the longitudinal movement of the conveyor is timed to receive, in end-to-end relation, the separate elongated units from the rotating pockets of the drum.

One form in which the invention may be exemplified is described herein and illustrated in the accompanying drawing which is made a part hereof.

In the drawing:

FIG. 1 is a side elevation of the apparatus of the invention partly broken away and partly in section.

FIG. 2 is a front end elevational view, partly broken away and partly in section.

Figure 3:
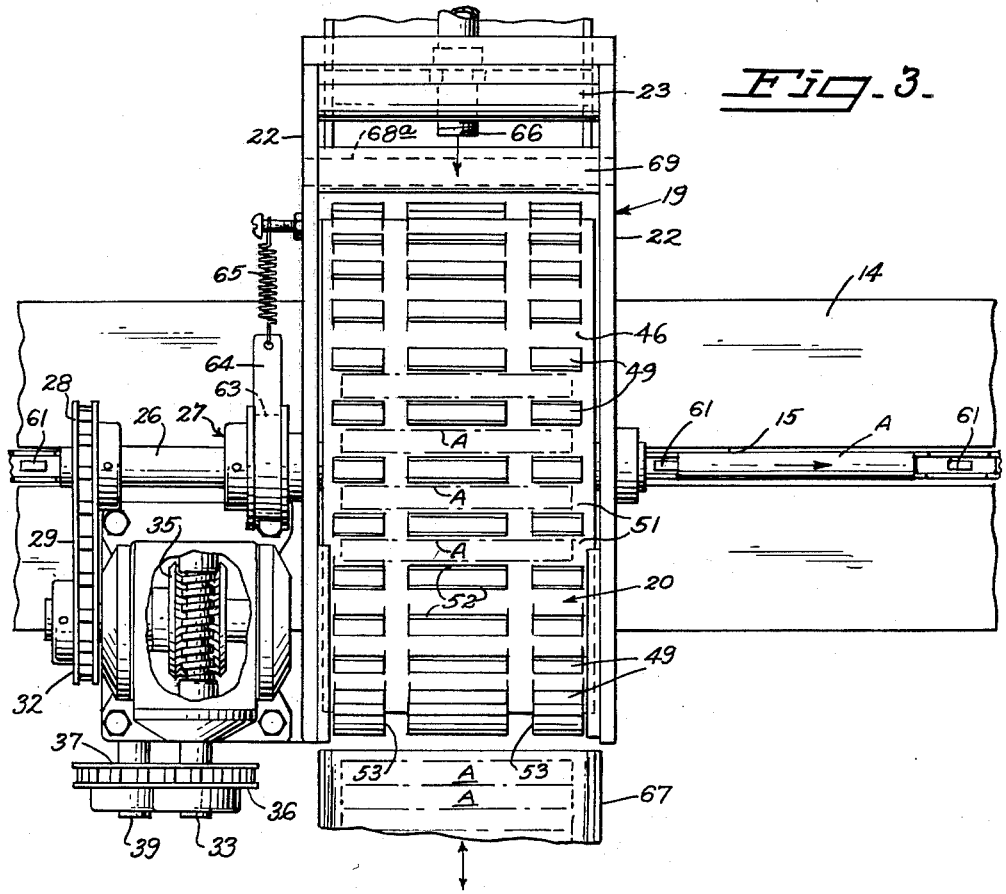
FIG. 3 is a top plan view.
Figure 4:
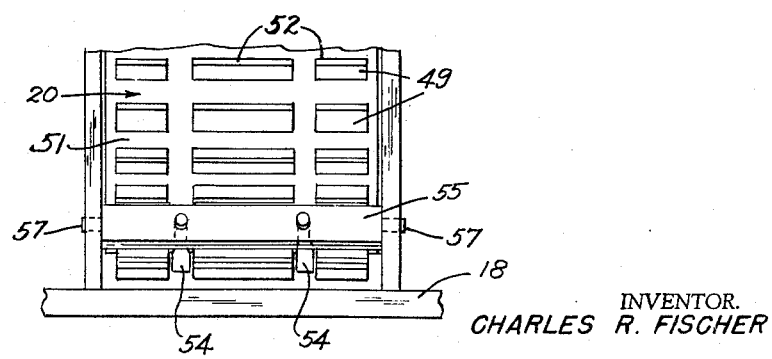
FIG. 4 is a fragmentary front elevational view of a portion of the drum member and mounting for stripping fingers.

Referring to the drawing in which like reference characters indicate corresponding parts in the several views, a supporting frame is generally indicated 10, upon which there is mounted an elongated continuous loop conveyor means 11 which is preferably a link chain belt having a conveying reach or flight 12 and a return flight 13, as indicated by arrows in the drawing, each conveyor chain having at the end thereof the usual sprockets (not shown), around which the conveyor chain is engaged, the sprockets and conveyor chains being driven by any suitable power source (not shown). The end of the conveyor flight adjacent frame 10 is designated the receiving end for the purposes of this invention. The opposite end portion of the conveyor is the delivery end for the product being handled for any desired purpose, such as wrapping, counting, labeling, or the like, the latter operation not being a part of the present invention and not shown or described.

The frame 10 supports an upper platform or table plate 14 longitudinally centrally of which there is a longitudinal chain-slot opening 15 extending longitudinally parallel to the direction of the movement of the conveyor flight 12, the table top at said slot, and extending the length of the conveyor flight, having downturned parallelly spaced opposed flanges 16. The conveyor flight of the chain moves in parallel recessed relation adjacently underlying said slotted opening and between the vertical planes of said flanges so that products passing through the slot opening 15 will normally fall upon the conveyor flight 12 of the chain conveyor and be guided and laterally supported thereon by said flanges. A second ancillary opening 17 is provided in said table top parallel with but offset from the said slot opening 15, and being of a length substantially similar to the axial length of grooved pockets at the circumference of a drum member to be described.

Mounted in overlying relation upon the table plate 14 at the opening 17 and the corresponding portion of the slot 15, there is fixedly mounted a base member 18 of a housing 19 for a rotor cylindrical drum generally indicated 20 which rotates counter-clockwise as viewed from its side shown in FIG. 1, said base member having openings therein communicating with and congruently corresponding to the underlying portion of slot 15 and the opening 17 and being respectively designated as a discharge opening 21 and ancillary skip opening 21$a$ of the base member, said discharge and skip openings being of a length substantially corresponding to the axial length of the pockets on the drum 20. Manifestly the table top 14 and base member 18 may be integral as a single unit with said openings 15, 21 and 17, 21$a$ consolidated as a single pair of openings, but it is preferred to have the base 18, housing 19 and drum 20 as a separate unit which may be installed as an appurtenance of a conventional conveyor means under appropriate circumstances of the operation. Upstanding from the base, the housing 19 has opposite side walls 22, the height of which may be increased at a forward end by substantially aligned supplemental side guides 22$a$. Preferably the housing is open at its two ends and top, the side walls being relatively positioned and supported by spacer bolts 23 which are preferably at the rearward portion of the housing.

Between the side walls of the housing there is rotatively mounted the drum 20 on a relatively concentric shaft 25 which is spaced above the conveyor flight 12 by the radius of the drum and extends through the rotative axis of the drum, the drum being fixedly secured to said axial shaft for rotation thereby, said shaft and rotative axis of the drum being substantially parallel with the conveyor chain 11, and the direction of rotation of the drum being thereby perpendicular to the direction of the movement of the conveyor chain. The hub shaft 25 extends a suitable distance beyond one of the side walls of the housing as at 26 for fixedly mounting thereon a brake means 27 and a driven sprocket 28, the sprocket 28 being driven by a downwardly inclined chain 29 which in turn is engaged by a drive sprocket 32, the latter being driven from a ratio gear box 34 which is offset from an adjacent wall of the drum housing 19 and adjacent to one end of the base member 18 of the housing. In the gear box 34 there is a set of ratio gears 35 which may be of any suitable conventional type and therefore are shown diagrammatically.

The ratio gears are driven by a rotatable shaft 33 by means of a sprocket 36 rotated by a chain drive 37, the latter extending downwardly adjacently spaced from an outer edge of the table plate, and the opposite end-loop of which meshes with a sprocket 38 fixedly mounted upon one end portion of a rotatable drive shaft 39. Thus the ratio gears 35 are operationally intermediate the gears 32 and 36. The shaft 39 has its opposite end portion extending laterally inwardly below the table plate and between the flights 12 and 13 of the conveyor chain 11, and passes through the supporting frame 10. The drive shaft 39 is supported on the frame 10 adjacent the conveyor chain 11 by spaced journals 41 which depend on each side of the conveyor from a cross-support 42 transversely of the frame. Upon the end portion of the drive shaft 39 which extends between the flights of the conveyor, and intermediately between the spaced journals 41, a sprocket drive gear 43 is fixedly mounted by pinning of its hub 44 to the drive shaft 39. The sprocket drive gear 43 is thus positioned to engage in the links of the driven conveyor chain, preferably the links of the return flight 13, as at 45, being thus rotated by the movement of the conveyor chain, and having its diameter substantially parallel to and preferably in the vertical plane of the rotative axis of the drum 20, which is also the vertical plane of guide slots 15 and 21 and the flights 12 and 13 of the conveyor chain.

Therefore the conveyor chain 11 rotatively drives the drum through the train of successive sprockets, shafts and chain drives, on the order of those elements respectively indicated 43, 39, 38, 37, 36, 33, 35, 32, 29, 28, 26, 25. Thus by changing the size of the single sprocket 43, the speed of operation of all of those successive elements may be simultaneously changed by the one operation of changing the size of the sprocket, which is made easily accessible underlying an end portion of the frame.

The drum generally indicated 20 being mounted on a rotative axis parallel to the direction of movement of the conveyor chain 11, rotates in a direction normal to the direction of the movement of the conveyor. The drum has an axially elongated cylindrical body 46, which is preferably hollow, the cylindrical shell being supported internally by spokes 48 upon a hub 47 which is pinned at 47a to shaft 25 for unison rotation therewith. At the circumferential outer face of the cylindrical drum body are a series of axially transverse radially extended members such as elongated ribs 49 which are circumferentially spaced relatively providing therebetween elongated transversely grooved pockets 51. These ribs and pockets are of substantially the same circumferential dimension relatively and are alternating around the entire outer circumference of the drum. The radially outer longitudinal edges of the ribs are convergingly chamfered at each edge, as indicated at 52 to facilitate the placing in and discharge from the grooves of elongated sticks of candy, which is the presently exemplified purpose of use of the apparatus.

These grooved pockets and ribs are intersected at the outer face of the drum by circumferential stripping grooves 53 which are continuous around the complete circumference. Preferably there are two of the stripping grooves 53, being relatively parallel and each being spaced from a side edge of the drum and spaced relative to each other.

Resilient stripping fingers 54 are suitably mounted on a pivotal block 55 between walls of the housing, and each has a free resilient end 56 which rides in each of the respective stripping grooves 53 at a position substantially in slidable contact with the circumferential face of the drum at the bottom of the groove and overlying the discharge slot opening 21 of the base member and the chain slot opening 15 of the table, said fingers stripping the product of candy sticks from the grooves 51 so that they may drop through said discharge opening onto the receiving forward end of conveyor flight 12 of the chain which underlies the discharge opening. Due to the pivotal mounting of the pivoted block as at 57 the position of the stripping fingers may be adjusted relative to the drum grooves 53 and discharge opening 21. Should, however, the rotary motion of the drum cause the product to be conveyed past the discharge opening 21, even though the product be stripped by the finger 54, then such product would drop through the skip openings 17, 21a, and fall through the frame into a pan 58 where it may be recovered and returned to the supply of products being fed to the drum.

The chain conveyor 11 is preferably provided with upstanding propelling finger lugs 61 extending outwardly from the plane of the chain and relatively spaced therealong sufficiently to provide elongated chain pockets 60 to receive and convey therein the separate units of the product stripped from the grooves of the drum. As best shown in FIG. 2, the movement of the chain and spacing of these fingers is preferably such that when the product A falls through the discharge openings 21, 15, it falls upon the chain at an incline with its forward end resting on the propelling finger 61 and the opposite or rearward end resting upon the chain forwardly spaced from the next succeeding or follower propelling finger, the purpose of this structure and mode of operation being to permit the product body, which is delivered from a rotational direction normal to the chain movement and is therefore static relative to the longitudinal movement of the chain, to slide to some extent in contact with the chain before it is dropped into the pocket space between the fingers 61 whereby it will have gathered substantially the same speed of longitudinal movement as the chain by the time it is propellingly engaged by the next following finger. The product is dropped completely into the pocket when its forward end comes into contact with the adjacent end wall of opening 21, as shown in FIG. 2. While the inclusion of propelling fingers 61 is preferred, it is to be noted that the chain would operate as a conveyor if such fingers were not employed.

The ratio gears 35 are synchronized and relatively timed so that there is a predetermined ratio between the respective speeds of longitudinal movement of the chain conveyor and the rotational movement of the drum. The ratio effected by the ratio gears 35 may be a variable depending on a number of factors such as the length of the article being handled, the length that it is desired to have on the conveyor for each of said articles, such as in the receiving pockets 60 between the fingers of the chain, the circumferential distance between the grooved pockets 51 of the drum and the desired speed of operation. Broadly, such a ratio of relative speeds of such respective rotational and longitudinal movements would substantially be that for the length of each predetermined receiving space on the conveyor moving past the stripping end 56 of the fingers 54 and the underlying discharge openings 15, 21 there should be a rotative movement of the drum for the circumferential dimension of one groove 51 plus one rib 49, that is, the distance between similar points of next adjacent pockets.

Having determined a proper and desired ratio of such relative movement of chain and drum, the ratio may be accomplished by a single adjustment of the ratio gears 35 in the gear box 34, whereby the gears in the remainder of the gear-and-chain train, as above described, may be of a uniform diameter and be maintained at a one to one ratio of rotation on the opposite sides of the ratio gears 35.

The brake means generally indicated 27 may be of any suitable drag type. Since normally the rotary drum 20 would be rotated slowly relative to the speed of the conveyor chain, the brake means would not normally be employed for retarding speed of rotation, but rather for providing a drag to stabilize the rotation at a constant speed and eliminate any possible jerks or irregularities of rotation. Therefore, the brake means may consist of a simplified drag type comprising a brake drum 63 fixedly pinned to shaft 26 of the rotated carrier drum, a brake shoe or band 64 passing around the brake drum and having connection to a tension spring 65.

Since the product in the present example is candy, which may have an inherent quality of being sticky, particularly in the presence of a moist atmosphere, it may be desirable to provide a jet of air directed against the product on the rotated drum, such as a blower outlet 66 at the rear side of the drum and housing.

While the units of the product may be manually fed to the rotated drum, it is preferred to provide a mechanical feed means 67 shown fragmentarily at the forward side of the housing. Such a means may be of any suitable conventional standard type which is commercially available, a vibrating conventional type being employed in the present exemplification, by which the units of the product are disposed and fed substantially parallel to the drum grooves or pockets 51.

As viewed in FIGS. 1 and 2 the circumference of the drum rotates counter-clockwise upward and away from the feed means 67, and the drive train is counter-clockwise from the drum to the ratio gears, whereas the drive train is clockwise from sprocket 43 to the ratio gears. These opposite directions of drive are reconciled and rendered compatible by the ratio gears, in addition to the function of the ratio gears to appropriately change the gear ratio.

Means are preferably provided for holding the product units in the grooves or pockets on the downward circumference of the drum between the horizontal diameter of the drum rotation, as indicated B, and the stripping fingers 54, such as an arcuate retaining plate 68, supported by a cross-bar 68a, the arcuate plate being closely spaced from and parallel with the downward counter-clockwise rotational circumference of the drum and the upper edge 69 of which will remove any product riding on the drum beyond the confines of the grooves or pockets and deposit them in a receiving pan 70 rearwardly of the drum.

In operation the flights of the chain conveyor are presumed to be moving in the directions indicated in FIG. 2 by the arrows responsive to suitable power source, and normally as a part of other apparatus to which the product of this feed device is to be delivered in single units. As the forward flight 12 of the chain moves it carries the conveyor pockets 60 successively under the discharge opening 21 and through the receiving portion of slot opening 15 which communicates with the opening 21. Simultaneously the conveyor chain rotates the sprocket 43, the shaft 39 and the sprocket 38, the latter in turn driving the chain drive 37 and sprocket 36 preferably at a one-to-one ratio, thereby rotating shaft 33 of the gear box and the ratio gears 35 driven thereby, the gears of the gear box suitably reducing the ratio so that the rotative output at gear 32 of the gear box is suitably reduced to the desired speed of rotation of the drum whereby the drive from the gear 32 to gear 28 of the drum-shaft 26 may likewise be a one-to-one ratio.

Thus having the drum in rotation at a predetermined ratio relative to the longituidnal movement of the chain pockets, the product may be fed manually, or preferably by mechanical vibrating means 67, the vibration of the feed urging the individual units of the product into the separate grooves as the drum is rotated closely adjacent to the discharge end of the feed. If one of the grooves 51 happens to be skipped, an operator may readily manually fill the groove as the drum moves rotatively, though failure to do so does not change the operation, the only result being that one of the moving chain pockets would remain empty. However, it is possible that the drum may pick up from the feed device two of the products as a unit, especially if they have any adhesive tendency. Only one unit would ride in a drum groove, the other being superposed thereon in which event the superposed unit would be cleared from the drum by the blast of air from nozzle 66 or by the upper edge 69 of the retaining plate 68, and dropped into the pan 70, for collection and refeeding. Those units which are in the grooves 51 will be carried to the stripping finger 54 and removed thereby, whereupon they drop through the opening 21 and into the receiving pockets 60 on the chain. While removal of the product from the drum grooves by the stripping fingers is quite certain and positive, there is a possibility that with a semi-adhesive product like candy the drum by its rotation might roll an occasional product past the opening 21, in which event that unit would fall through the skip openings 21a, 17 and thence into pan 58.

Having thus described the invention, what is claimed as new and patentable is:

1. A rotary feed apparatus having a slotted table plate and a driven continuous loop conveyor having a conveyor flight parallelly underlying the slot of said table plate, said slot providing a discharge opening through the plate, a rotatable cylindrical drum overlying the discharge portion of the slot and having its rotative axis parallel to said table slot and conveyor, the said drum having elongated pockets alternating with relatively parallel ribs axially transversely at its outer circumferential face for loosely holding elongated articles, said pockets being intersected circumferentially by a stripping groove, a stripping finger having an end portion lying in said stripping groove adjacently overlying the discharge portion of the slot whereby the stripped articles may fall from the pockets into said slot and onto the underlying conveyor, means for rotating said drum including a train of driven sprocket gears, said train of gears including ratio gears adapted for timing the rotation of the drum relative to the longitudinal movement of the conveying flight of the conveyor which underlies said slot, the said table plate having an ancillary second opening therethrough substantially parallel and adjacently spaced from said discharge table slot, said second opening being laterally offset from overlying relation relative to the conveyor.

2. A rotary feed apparatus comprising a cylindrical drum mounted rotatably on its axis, a driven continuous loop conveyor chain having a conveyor flight underlying the drum and parallel with the axis thereof, said drum having elongated pockets axially transversely of its outer circumferential face for loosely holding elongated articles, said pockets being intersected circumferentially of the drum by at least one stripping groove, a stripping finger means having its terminal end portion riding in said stripping groove at a position between the drum and said conveyor flight and adjacently overlying the conveyor flight, said conveyor having pusher fingers upstanding therefrom and relatively spaced substantially the length of the drum pockets, means for rotating said drum including means for synchronously timing the rotation of the drum relative to the longitudinal movement of said conveyor flight of the conveyor and fingers thereon, said table plate having a discharge guide slot interposed between the drum pockets and the conveyor flight of the conveyor for receiving therethrough articles stripped from the drum by said stripping finger and depositing them to the conveyor flight, said discharge slot being parallel with the conveyor flight of the conveyor and the elongated pockets of the drum and substantially underlying the position at which the said end of the stripping finger engages in the stripping groove, and a second slot parallel with the discharge guide slot and adjacently spaced therefrom in a direction transversely to the axis of the drum and said conveyor flight, whereby said second slot is adjacently offset from overlying relation relative to the said conveyor flight of the conveyor.

References Cited in the file of this patent

UNITED STATES PATENTS

| | | |
|---|---|---|
| 946,252 | Moon | Jan. 11, 1910 |
| 1,606,834 | Halank | Nov. 16, 1926 |
| 1,793,158 | Clayton | Feb. 17, 1931 |
| 1,827,553 | Algeo et al. | Oct. 13, 1931 |
| 1,874,442 | Calloway | Aug. 30, 1932 |
| 1,953,818 | Paridon | Apr. 3, 1934 |
| 2,106,469 | Seil | Jan. 25, 1938 |
| 2,233,379 | Cope | Feb. 22, 1941 |
| 2,335,239 | Gladfelter | Nov. 30, 1943 |
| 2,628,701 | Schrage | Feb. 17, 1953 |
| 2,655,247 | Carroll et al. | Oct. 13, 1953 |
| 2,696,327 | Woodruff | Dec. 7, 1954 |
| 2,818,964 | Picard et al | Jan. 7, 1958 |
| 2,956,520 | Keller | Oct. 18, 1960 |